United States Patent
Hart et al.

(10) Patent No.: US 10,530,809 B1
(45) Date of Patent: Jan. 7, 2020

(54) SYSTEMS AND METHODS FOR REMEDIATING COMPUTER STABILITY ISSUES

(71) Applicant: Symantec Corporation, Mountain View, CA (US)

(72) Inventors: Michael Hart, Farmington, CT (US); Chris Gates, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 274 days.

(21) Appl. No.: 15/266,483

(22) Filed: Sep. 15, 2016

(51) Int. Cl.
H04L 29/06 (2006.01)
G06N 20/00 (2019.01)

(52) U.S. Cl.
CPC .......... *H04L 63/145* (2013.01); *G06N 20/00* (2019.01); *H04L 63/101* (2013.01); *H04L 63/1408* (2013.01)

(58) Field of Classification Search
None
See application file for complete search history.

(56) References Cited

U.S. PATENT DOCUMENTS

| | | | | |
|---|---|---|---|---|
| 5,774,357 A * | 6/1998 | Hoffberg | G06F 9/453 | 713/600 |
| 7,490,073 B1 * | 2/2009 | Qureshi | G06N 5/048 | 706/50 |
| 9,235,802 B1 * | 1/2016 | Chamness | G06F 11/08 | |
| 9,516,053 B1 * | 12/2016 | Muddu | G06F 16/254 | |
| 10,339,308 B1 | 7/2019 | Hart et al. | | |
| 2007/0074149 A1 * | 3/2007 | Ognev | G06F 11/366 | 717/101 |
| 2011/0040983 A1 * | 2/2011 | Grzymala-Busse | G06F 21/6245 | 713/189 |
| 2011/0066585 A1 | 3/2011 | Subrahmanyam et al. | | |
| 2011/0197090 A1 * | 8/2011 | Colbert | G06F 11/0715 | 714/2 |
| 2011/0314148 A1 * | 12/2011 | Petersen | G06F 11/3476 | 709/224 |

(Continued)

OTHER PUBLICATIONS

Bo Shuai, Haifeng Li, Mengjun Li, Quan Zhang and Chaojing Tang, "Automatic Classification for Vulnerability Based on Machine Learning", Aug. 2013, Proceeding of the IEEE, International Conference on Information and Automation, Yinchuan, China, pp. 312-318 (Year: 2013).*

(Continued)

*Primary Examiner* — Khalil Naghdali
*Assistant Examiner* — Arezoo Sherkat
(74) *Attorney, Agent, or Firm* — FisherBroyles, LLP

(57) ABSTRACT

The disclosed computer-implemented method for remediating computer stability issues may include (i) determining that a device has experienced a computer stability problem, (ii) obtaining, from the device, one or more computer-generated log lines that potentially include information pertaining to a cause of the computer stability problem, (iii) directly analyzing text included within the computer-generated log lines, (iv) identifying information relating to the computer stability problem based on the direct analysis of the text, and (v) remediating the device to resolve the computer stability problem. Various other methods, systems, and computer-readable media are also disclosed.

20 Claims, 9 Drawing Sheets

(56) References Cited

U.S. PATENT DOCUMENTS

| | | | | |
|---|---|---|---|---|
| 2012/0017232 | A1* | 1/2012 | Hoffberg | G06N 7/06 725/13 |
| 2012/0317058 | A1* | 12/2012 | Abhulimen | G06N 99/005 706/2 |
| 2013/0262082 | A1* | 10/2013 | McKeeman | G06F 17/27 704/9 |
| 2014/0258528 | A1* | 9/2014 | Miller | H04L 47/70 709/225 |
| 2014/0259170 | A1* | 9/2014 | Amsler | H04L 63/20 726/23 |
| 2014/0349269 | A1* | 11/2014 | Canoy | G06N 99/005 434/322 |
| 2016/0099963 | A1* | 4/2016 | Mahaffey | H04L 63/0227 726/25 |
| 2016/0104076 | A1* | 4/2016 | Maheshwari | G06N 99/005 706/12 |
| 2016/0218933 | A1* | 7/2016 | Porras | H04L 63/20 |
| 2016/0219048 | A1* | 7/2016 | Porras | H04L 63/20 |
| 2016/0294606 | A1* | 10/2016 | Puri | H04L 41/0695 |
| 2016/0299934 | A1 | 10/2016 | Karandikar et al. | |
| 2017/0063762 | A1* | 3/2017 | Machol | H04L 51/18 |
| 2017/0063887 | A1* | 3/2017 | Muddu | G06F 16/254 |
| 2017/0214708 | A1* | 7/2017 | Gukal | H04L 63/1433 |
| 2017/0242907 | A1 | 8/2017 | Goris et al. | |
| 2017/0251003 | A1 | 8/2017 | Rostami-Hesarsorkh et al. | |
| 2017/0339178 | A1* | 11/2017 | Mahaffey | H04L 41/142 |
| 2017/0353477 | A1* | 12/2017 | Faigon | H04L 63/1416 |

OTHER PUBLICATIONS

Event Schema Elements; https://msdn.microsoft.com/en-us/library/windows/desktop/aa384367(v=vs.85).aspx; as accessed Jan. 2, 2017; Aug. 1, 2012.

Log File; https://en.wikipedia.org/wiki/Logfile; as accessed Jan. 2, 2017; Aug. 13, 2013.

Latent Dirichlet Allocation; https://en.wikipedia.org/wiki/Latent_Dirichlet_allocation; as accessed Jan. 2, 2017; Sep. 13, 2006.

Michael Hart et al.; Systems and Methods for Remediating Computer Reliability Issues; U.S. Appl. No. 15/347,933, filed Nov. 10, 2016.

* cited by examiner

SYSTEMS AND METHODS FOR REMEDIATING COMPUTER STABILITY ISSUES

BACKGROUND

Security services often rely on log files to determine the state of a machine (e.g., whether the machine is malfunctioning). Conventionally, security services maintain event schemas (i.e., structured data objects) that identify and define elements and types within log files. Then, when attempting to determine the state of a machine, security services conventionally parse the machine's log lines to extract various elements (e.g., the IP address, a signature, the text, etc.) and map the extracted elements to elements in the event schemas. Based on information provided in the event schemas for its various elements, conventional security systems may determine the state of the machine. In other words, traditional approaches (i) take unstructured information provided in the log files of a machine, (ii) map the unstructured information into a structured schema format, and (iii) form a conclusion about the state of the machine based on information provided in the schema.

Thus, in traditional approaches, in order to derive information about the state of a machine from a particular log line, the particular log line must have been previously analyzed and added to a schema. As such, an event schema created for a certain product may not be used for other (e.g., newly created) products (i.e., whose log lines vary from the log lines of the certain product) or even for an updated version of the certain product. The instant disclosure, therefore, identifies and addresses a need for systems and methods for using log lines to analyze computer stability issues that abandons the rigidity imposed by traditional event schema approaches.

SUMMARY

As will be described in greater detail below, the instant disclosure describes various systems and methods for remediating computer stability issues. In one example, a computer-implemented method for analyzing computer stability issues may include (i) determining that a device has experienced a computer stability problem, (ii) obtaining, from the device, one or more computer-generated log lines that potentially include information pertaining to a cause of the computer stability problem, (iii) directly analyzing text included within the computer-generated log lines, (iv) identifying information relating to the computer stability problem based on the direct analysis of the text, and (v) remediating the device to resolve the computer stability problem.

In some examples, determining that the device has experienced the computer stability problem may include determining that the device has experienced the computer stability problem in response to identifying (i) a decrease in the overall stability of the device, (ii) a decrease in the stability of application software installed on the device, and/or (iii) a decrease in the stability of system software installed on the device. In some examples, obtaining the one or more computer-generated log lines may include obtaining the one or more computer-generated log lines from a security product running on the device, or from a security product monitoring the device. In one embodiment, directly analyzing the text may include analyzing the text using natural language processing.

In one example, the computer-implemented method may further include training a machine learning classifier to identify stability-disrupting computer events based solely on text within log lines. In this example, directly analyzing the text may include using the machine learning classifier to analyze the text. In some examples, training the machine learning classifier may include training the machine learning classifier with examples of log files associated with one or more previously identified stability problems.

In one embodiment, at least one of the computer-generated log lines may include a novel log line that had not previously been analyzed by the machine learning classifier. This novel log line may have been produced by a program whose log lines had not previously been analyzed by the machine learning classifier and/or a recently updated program whose log lines had not been analyzed by the machine learning since the update.

In some examples, the computer-implemented method may identify the information relating to the computer stability problem (i.e., based on the direct analysis of the text) without relying on any previously established event schemas.

In one embodiment, the computer-implemented method may further include determining, based on the information relating to the computer stability problem, that the computer stability problem was likely caused by a malicious event incited by a malicious program. In this embodiment, remediating the device may include performing a security action. In some examples, the security action may include (i) removing the malicious program from the device, (ii) transmitting a notification to at least one of the device and an additional computing device that indicates that device has been infected with malware, and/or (iii) blacklisting at least one of the malicious event and the malicious program.

In one embodiment, a system for implementing the above-described method may include (i) a determination module, stored in memory, that determines that a device has experienced a computer stability problem, (ii) an obtaining module, stored in memory, that obtains, from the device, one or more computer-generated log lines that potentially include information pertaining to a cause of the computer stability problem, (iii) an analysis module, stored in memory, that directly analyzes text included within the computer-generated log lines, (iv) an identification module, stored in memory, that identifies information relating to the computer stability problem based on the direct analysis of the text, (v) a remediation module, stored in memory, that, based on the information relating to the computer stability problem, remediates the device to resolve the computer stability problem, and (vi) at least one physical processor configured to execute the determination module, the obtaining module, the analysis module, the identification module, and the remediation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that a device has experienced a computer stability problem, (ii) obtain, from the device, one or more computer-generated log lines that potentially include information pertaining to a cause of the computer stability problem, (iii) directly analyze text included within the computer-generated log lines, (iv) identify information relating to the computer stability problem based on the direct analysis of the text, and (v) remediate the device to resolve the computer stability problem.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
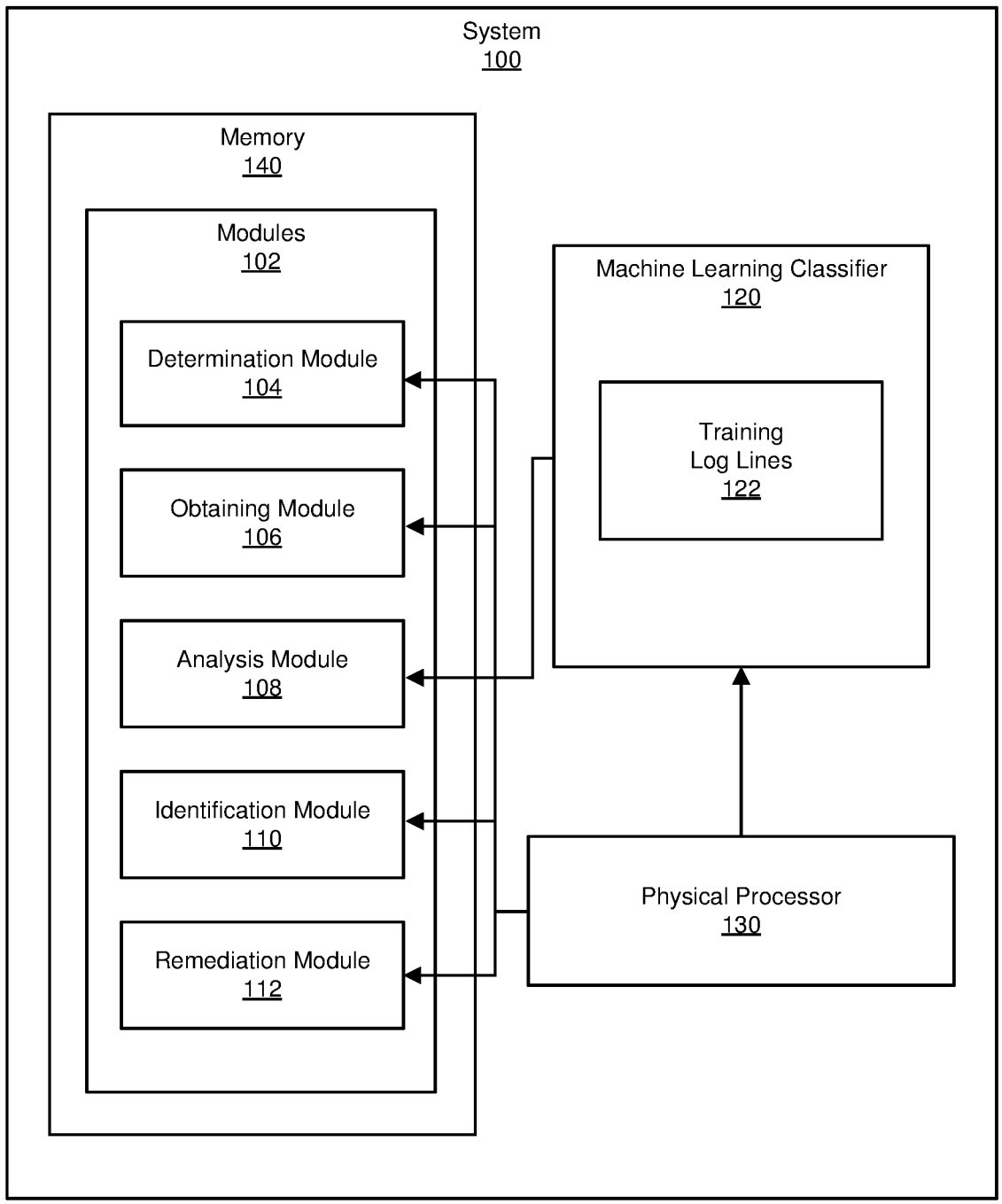
FIG. 1 is a block diagram of an example system for remediating computer stability issues.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for remediating computer stability issues. As will be explained in greater detail below, by directly analyzing a log line's text, the systems and methods described herein may quickly glean information about stability-disrupting computer events associated with the log line (e.g., using natural language processing techniques).

By analyzing log lines in this way, the systems and methods described herein may improve and/or increase the information that may be obtained from log lines when compared to conventional schema-based log analysis. In addition, the systems and methods described herein may improve the functioning of a computing device by diagnosing the cause of computer stability issues so that the stability issues may be resolved. These systems and methods may also improve the field of computer diagnostics and incident generation by enabling analysis of novel log lines without requiring that such log lines be painstakingly added to a pre-existing schema or that parsers associated with pre-existing schemas, which become ineffectual over time, be constantly updated.

The following will provide, with reference to FIGS. 1-2 and 4-5, detailed descriptions of example systems for remediating computer stability issues. Detailed descriptions of corresponding computer-implemented methods will also be provided in connection with FIG. 3. Detailed descriptions of conventional methods (over which the disclosed systems and methods are an improvement) will be provided in connection with FIG. 6-7. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for analyzing computer stability issues. As illustrated in this figure, exemplary system 100 may include one or more modules 102 for performing one or more tasks. For example, and as will be explained in greater detail below, exemplary system 100 may include a determination module 104 that determines that a device has experienced a computer stability problem. Exemplary system 100 may additionally include an obtaining module 106 that obtains, from the device, one or more computer-generated log lines that potentially include information pertaining to a cause of the computer stability problem. Exemplary system 100 may also include an analysis module 108 that directly analyzes text included within the computer-generated log lines. Exemplary system 100 may additionally include an identification module 110 that identifies information relating to the computer stability problem based on the direct analysis of the text. Exemplary system 100 may also include a remediation module 112 that, based on the information relating to the computer stability problem, remediates the device to resolve the computer stability problem. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate remediating computer stability issues. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a machine learning classifier 120. Machine learning classifier generally represents any type or form of data structure capable of directly analyzing log line text and classifying the log lines based directly on the text (as opposed to classifying the log line based on information provided in an event schema). In some examples, machine learning classifier 120 may have been trained on the text of training log lines 122 using machine learning techniques, as will be described in greater detail in connection with step 306. In one embodiment, machine learning classifier 120 may have been trained to analyze log lines using dimension reduction techniques.

Figure 2:
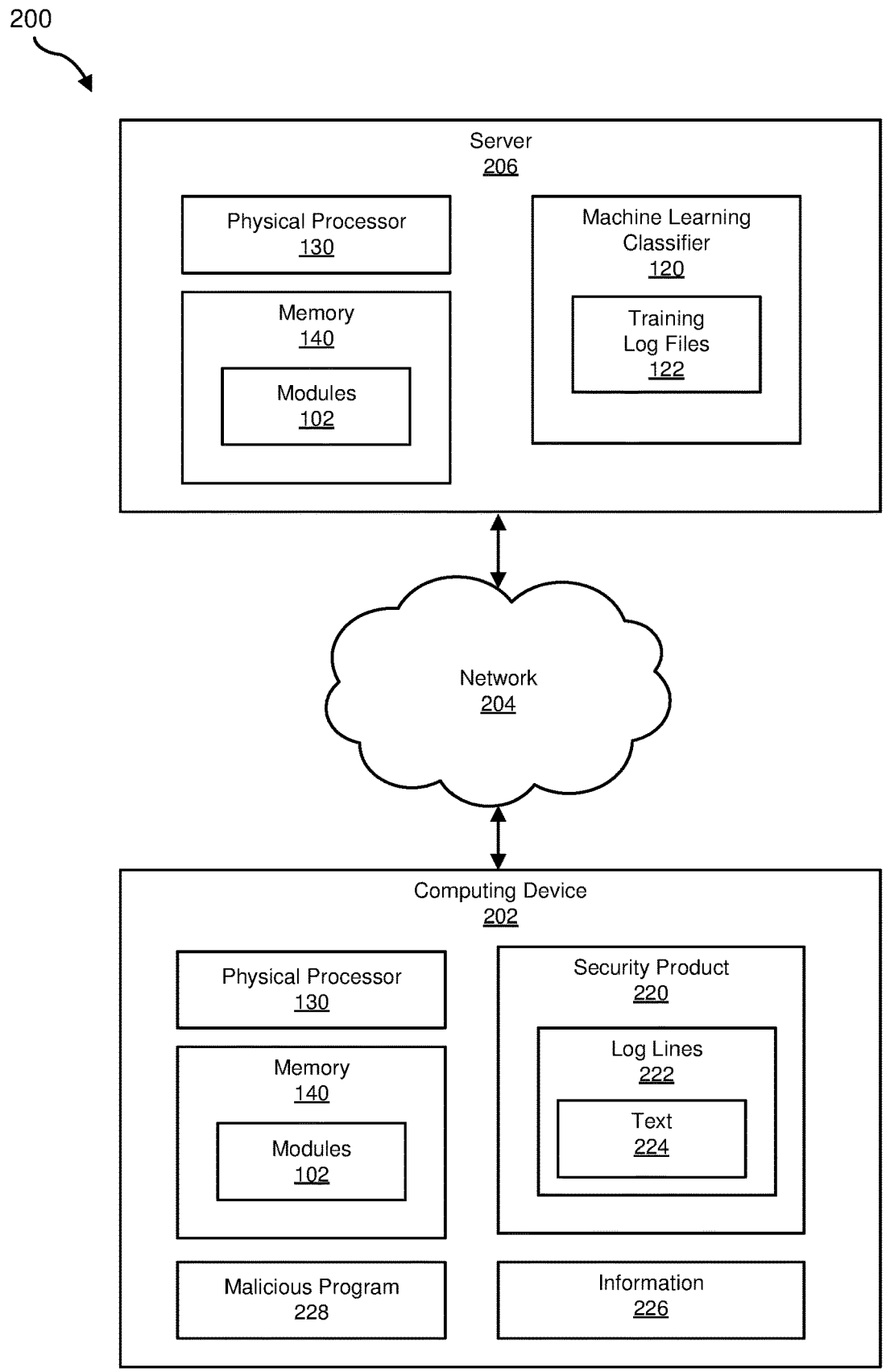
FIG. 2 is a block diagram of an additional example system for remediating computer stability issues.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. All or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to analyze computer stability issues. For example, and as will be described in greater detail below, determination module 104 may determine that computing device 202 has experienced a computer stability problem. Obtaining module 106 may obtain, from computing device 202 (in some examples, from security product 220 running on computing device 202), one or more computer-generated log lines 222 that potentially include information pertaining to a cause of the computer stability problem. Analysis module 108 may analyze text 224 included within log lines 222. Identification module 110 may identify information 226 relating to the computer stability problem based on the direct analysis of text 224. Remediation module 112 may, based on information 226, remediate computing device 202 to resolve the computer stability problem. In some examples, identification module 110 may determine that stability issue was caused by malicious activity performed by a malicious program 228.

Computing device 202 generally represents any type or form of computing device capable of reading computer-executable instructions. In some examples, computing device 202 may represent a client device running client-client security software provided by a security service managing server 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of inferring the cause of computer stability issues based on a direct analysis of log line text. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Security product 220 generally represents any type or form of computer program that causes a computing system to perform useful (e.g., security-related) tasks, such as anti-virus software or a firewall. In some examples, security product 220 may create and/or maintain log files with log lines, such as log lines 222.

Log lines 222 generally represent any type or form of computer-generated record including text (e.g., text 224) that tracks the computer events that occur within a computing system. In some examples, log lines 222 may include text (e.g., text 224) that indicates normal activity on computing device 202 (e.g., "user authenticated successfully"). In other examples, log lines 222 may include text that indicates a computer stability problem, such as a malicious attack (e.g., "Trojan.Zbot infection quarantine").

Figure 3:
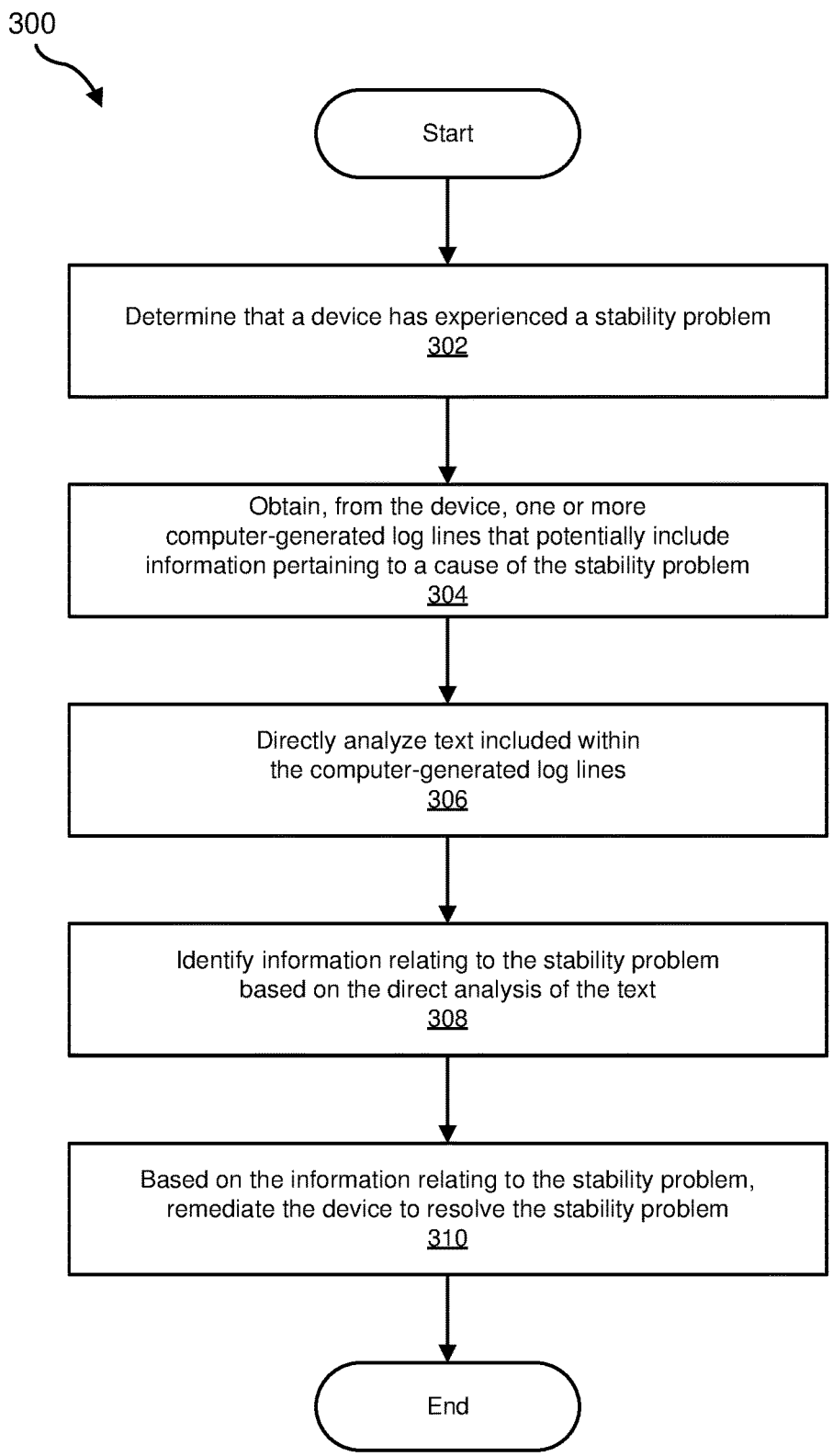
FIG. 3 is a flow diagram of an example method for remediating computer stability issues.

FIG. 3 is a flow diagram of an example computer-implemented method 300 for remediating computer stability issues. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may determine that a device has experienced a computer stability problem. For example, determination module 104 may, as part of computing device 202 and/or server 206 in FIG. 2, determine that computing device 202 has experienced a computer stability problem.

Determination module 104 may determine that computing device 202 has experienced a computer stability problem in a variety of ways. For example, determination module 104 may determine that computing device 202 has experienced a decrease in the overall stability of the device. Additionally or alternatively, determination module 104 may determine that computing device 202 has experienced a decrease in the stability of application software installed on the device and/or a decrease in the stability of system software installed on the device.

Determination module 104 may detect such decreases in stability based on a variety of computer symptoms. For example, computing device 202 may have experienced a slowdown, unwanted pop-ups, or a crash. Additionally or alternatively, computing device 202 may have experienced suspicious hard drive activity, such as unexpectedly running out of hard drive space. In some examples, computing device 202 may have experienced unusually high network activity, received unusual messages, or experienced unwanted configuration changes.

In some examples, determination module 104 may operate as part of a security product that manages the security of computing device 202 (such as security product 220). In these examples, determination module 104 may determine that computing device 202 has experienced a computer stability problem based on routine activity-monitoring performed by determination module 104. Additionally or alternatively, determination module 104 may determine that computing device 202 has experienced a computer stability problem based on user input indicating the same.

In some examples, determination module 104 may (in addition or as an alternative to determining that computing device 202 as a whole is experience a computer stability problem) determine that a specific entity associated with computing device 202 is experiencing the computer stability problem. For example, determination module 104 may determine that a computer stability problem is being experienced by a user account of a particular user logged into computing device 202, an IP address associated with computing device 202, and/or any other entity for which computing device 202 and/or security product 220 may be capable of aggregating log entries.

At step 304, one or more of the systems described herein may obtain, from computing device 202, one or more computer-generated log lines that potentially include information pertaining to a cause of the computer stability problem. For example, obtaining module 106 may, as part of computing device 202 and/or server 206 in FIG. 2, obtain, from computing device 202, one or more computer-generated log lines 222 that potentially include information 226 pertaining to a cause of the computer stability problem. Using FIG. 4 as a specific example, obtaining module 106 may obtain text (i.e., novel log line text 400) with the words "Detected an OGNL remote code execution attempt (Apache Struts)" from one of log lines 222.

Obtaining module 106 may obtain computer-generated log lines 222 in a variety of ways. In some examples, obtaining module 106 may obtain computer-generated log lines 222 from a program that generated and/or maintains computer-generated log lines 222. For example, obtaining module 106 may obtain computer-generated log lines 222 from security product 220. In examples in which the computer stability problem was experienced by an entity associated with computing device 202 (e.g., a user account, an IP address, etc.), obtaining module 106 may obtain computer-generated log lines 222 from a program that aggregates log lines for that particular entity's activities on computing device 202. In some examples, obtaining module 106 may obtain computer-generated log lines 222 from a product running on computing device 202. Additionally or alternatively, obtaining module 106 may obtain computer-generated log lines 22 from a product monitoring computing device 202 (e.g. a firewall).

In one embodiment, obtaining module 106 may obtain computer-generated log lines 222 by searching computing device 202 for log lines that may be relevant to the computer stability problem (e.g., by scanning folders of computing device 202 for such log lines). In some examples, obtaining module 106 may search for log lines that were created during a certain time period related to the time during which computing device 202 experienced the computer stability problem in order to build up a set of log lines that represent the relevant activity responsible for the computer stability problem. In additional examples, obtaining module 106 may further refine the search to identify log lines corresponding to an entity associated with computing device 202 that experienced the computer stability problem. In some examples, obtaining module 106 may filter out log lines previously identified as non-interesting. For example, obtaining module 106 may filter out log lines that include text that has been previously identified (e.g., via machine learning) as not pertaining to a computer stability issue.

In some embodiments, obtaining module 106 may collect relevant log lines using a small set of parsers capable of sorting through log lines and sending the log lines to aggregators for an appropriate entity. The number of parsers needed to perform these tasks may be minimal when compared with the number of parsers needed to perform the schema filtering of conventional log-line analysis techniques. In some examples, the functionality performed by these parsers may be relatively lightweight, primarily including (i) identifying which sections of a log identifies the origination of an event and/or (ii) identifying which section of a log identifies the event's endpoint. In one embodiment, obtaining module 106 may, in addition to collecting relevant log line text, obtain potentially relevant non-log-file information (such as the computing devices' configuration and/or normal operating levels).

Returning to FIG. 3, at step 306, one or more of the systems described herein may directly analyze text included within the computer-generated log lines. For example, analysis module 108 may, as part of computing device 202 in FIG. 2, analyze text 224 included within the computer-generated log lines 222.

Analysis module 108 may analyze text 224 in a variety of ways. In some examples, analysis module 108 may analyze text 224 using machine learning classifier 120. In one embodiment, the disclosed systems and methods may have trained machine learning classifier 120 to identify stability-disrupting computer events based on the text within log lines associated with stability problems previously identified on other computing devices and log lines that are associated with computing devices that are not experiencing stability issues (e.g., the text of training log lines 122). Based on information gleaned from training samples, machine learning classifier 120 may identify a set of words that are indicative of a computer failure and a set of words that are indicative of regular activity. For example, machine learning classifier 120 may determine that the words "password," "login," "data," "successful," and "authentication" are indicative of regular activity but the words "cracking," "force," "brute," and "exposure" are indicative of a malware attack.

Figure 5:
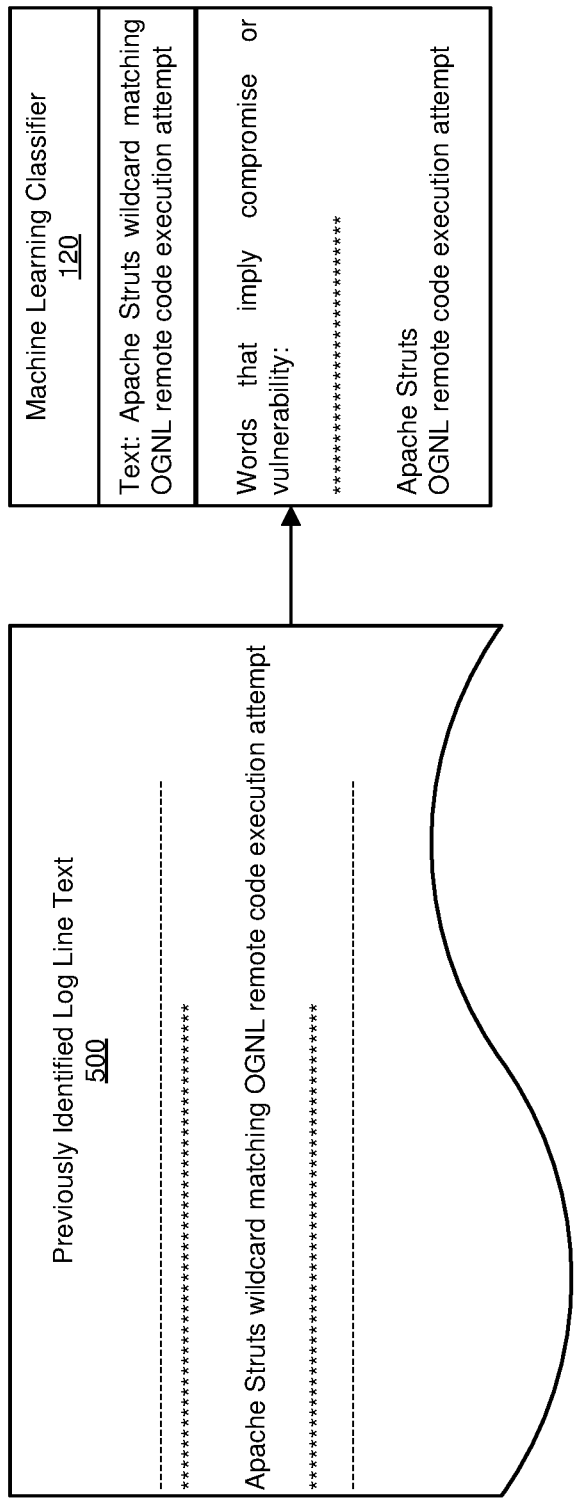
FIG. 5 is a block diagram of an exemplary machine learning classifier analyzing the text in a previously identified log line.

Using FIG. 5 as a specific example, the disclosed systems and methods may have trained machine learning classifier 120 with previously identified log line text 500 (i.e., "Apache Struts wildcard matching OGNL remote code execution attempt"), collected from a computing device known to have experienced a web attack at the time previously identified log line text 500 was collected. As illustrated in FIG. 5, machine learning classifier 120 may have automatically learned, from previously identified log line text 500, that the words "Apache Struts" and "OGNL remote code execution attempt" imply a compromise and/or vulnerability.

After being trained, machine learning classifier 120 may search text 224 for words that imply a computer stability problem. Using FIG. 5 as a specific example, machine learning classifier 120 may search text 224 for words that machine learning classifier 120 previously learned imply compromise or vulnerability (i.e., "Apache Struts" and "OGNL remote code execution attempt"). In some examples, machine learning classifier 120 may analyze text 224 using natural language processing. In one such example, machine learning classifier 120 may utilize a generative statistical model such as latent Dirichlet allocation. In one embodiment, machine learning classifier 120 may apply an unsupervised, or semi-supervised, mixture model to map information obtained from an aggregated set of log lines (i.e., computer-generated log lines 222) into a latent space representing activity for computing device 202 (and/or the entity associated with computing device 202 that experienced the computer stability problem) within the time frame that is relevant to the computer stability problem.

In one embodiment, at least one of computer-generated log lines 222 may include a novel log line that had not previously been analyzed by machine learning classifier 120. Using FIG. 4 as a specific example, one of computer-generated log lines 222 may include the novel text "Detected an OGNL remote code execution attempt (Apache Struts)" (as illustrated by novel log line text 400). This novel log line may have been produced by a program whose log lines had not previously been analyzed by machine learning classifier 120. Additionally or alternatively, the novel log line may have been produced by a recently updated program whose log lines had not been analyzed by the machine learning since the update.

Figure 6:
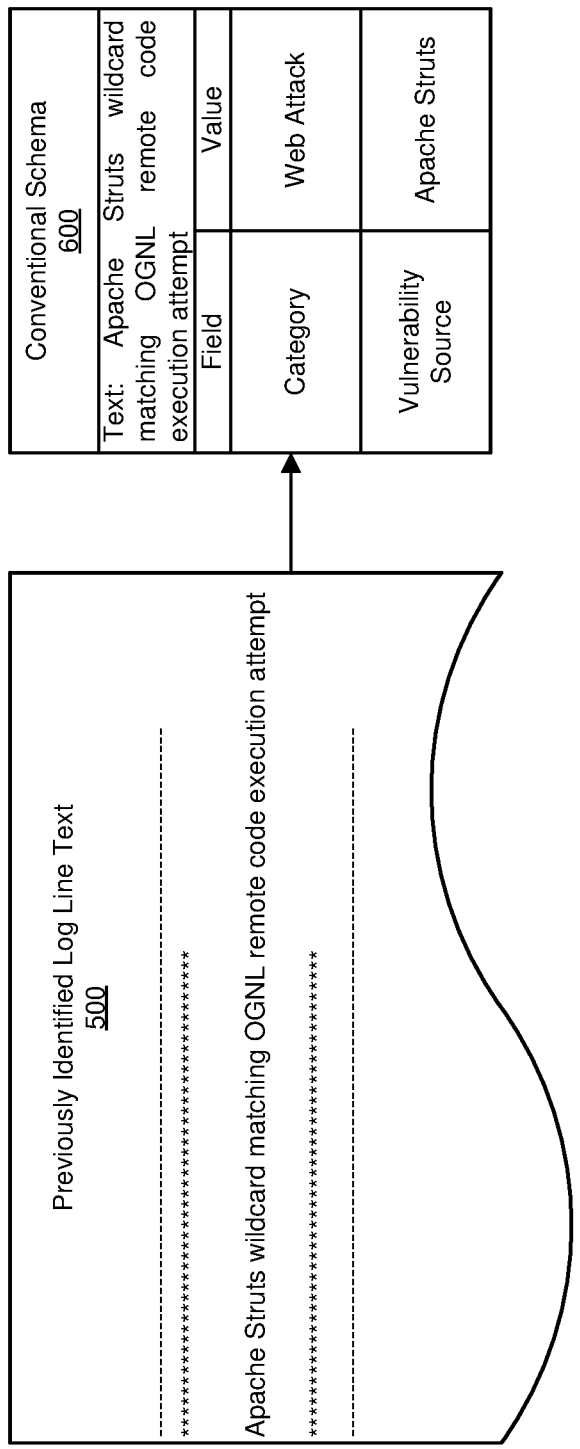
FIG. 6 is a block diagram of an exemplary conventional schema that provides information about a previously identified log line.

In this embodiment, novel log line text 400 may represent log line text that conventional schema-based approaches may not be able to correctly parse (e.g., because the log file being parsed is a novel log file that the conventional parser has not been configured to parse). For example, as shown in FIG. 6, a conventional schema-based approach may include a conventional schema 600 created for a particular product. Conventional schema 600 may include an entry (often, a manually created entry) for the log line text "Apache Struts wildcard matching OGNL remote code execution attempt." Conventional schema 600 may indicate that this log line text corresponds to the category "Web Attack" and that "Apache Struts" is the vulnerability source. Thus, if the conventional schema-based approach later collects a log line with the text "Apache Struts wildcard matching OGNL remote code execution attempt," the conventional schema-based approach may obtain information (such as category and vulnerability source information) by matching the log line text with the entry from conventional schema 600.

Figure 7:
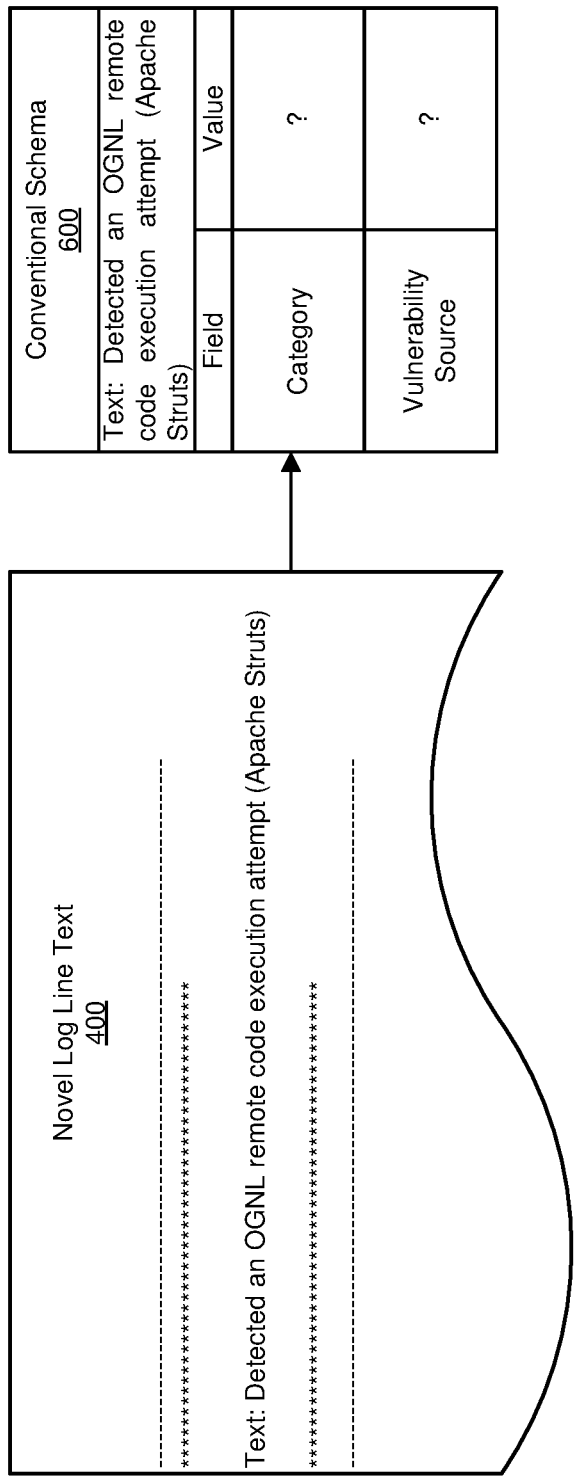
FIG. 7 is a block diagram of an exemplary conventional schema that is unable to provide information about a novel log line.

However, if the conventional schema-based approach later collects a novel log line (e.g., from a new and/or updated product), the conventional schema-based approach may be unable to glean useful information from the novel log line because, when the conventional schema-based approach queries conventional schema 600, there will be no entry for the novel log line. For example, as shown in FIG. 7, if the conventional schema-based approach collects novel log line text 400 (i.e. "Detected an OGNL remote code execution attempt (Apache Struts)," the conventional schema-based approach will find no information in conventional schema 600 because an entry for novel log line text 400 has not been created.

Figure 4:
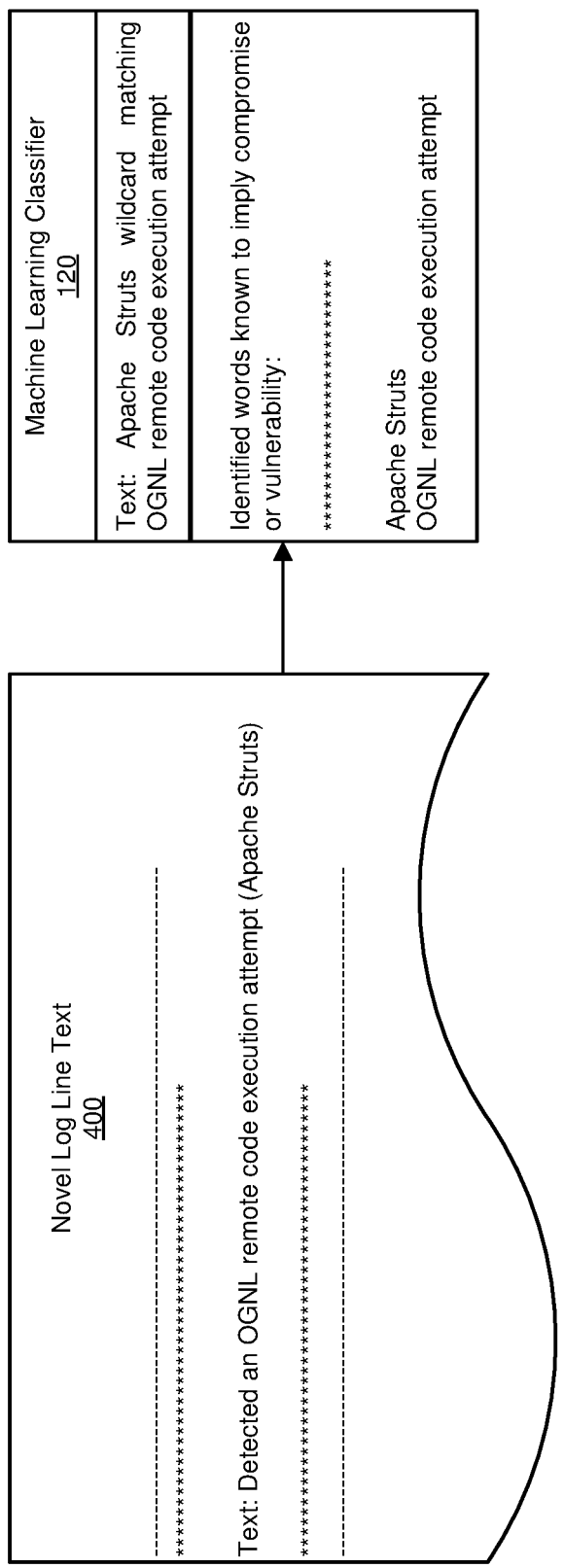
FIG. 4 is a block diagram of an exemplary machine learning classifier analyzing the text in a novel log line.

By contrast, because the disclosed systems and methods analyze raw textual data (instead of relying on rigid product-specific schemas), analysis module 108 may analyze novel log line text 400 without difficulty. For example, as shown in FIG. 4, analysis module 108 may determine that novel log line text 400 implies compromise or vulnerability because novel log line text 400 includes the words "Apache Struts" and "OGNL remote code execution attempt" (words that machine learning classifier 120 had previously determined imply such traits, as illustrated in FIG. 5).

In some embodiments, the disclosed systems and methods may have also obtained non-log-file information from the other computing devices (such as the computing devices' configuration and/or normal operating levels) and used this non-log-file information to train machine learning classifier 120 in addition to using the log file information. In these examples, machine learning classifier 120 may also use non-log-file information obtained (e.g., from obtaining module 106) for computing device 202 during a relevant time frame to determine the state of computing device 202.

In some examples, machine learning classifier 120 may learn (after looking at copious numbers of examples) that certain information included in the text (and/or certain non-log-file information), which would not have appeared relevant to a human analyst, may be indicative of a particular computer state (e.g., infected, not infected, etc.). In some instances, machine learning classifier 120 may identify relevant information from a single log line. In other instances, the machine learning classifier may identify relevant information based on aggregated information from two or more log lines. In some embodiments, machine learning classifier 120 may be constantly learning and adapting over time.

Returning to FIG. 3, at step 308, one or more of the systems described herein may identify information relating to the computer stability problem based on the direct analysis of the text. For example, identification module 110 may, as part of computing device 202 and/or server 206 in FIG. 2, identify information 226 relating to the computer stability problem based on the direct analysis of text 224 (e.g., an analysis performed by machine learning classifier 120).

In some examples, identification module 110 may identify information 226 without relying on any previously established event schemas. This may allow identification module 110 to obtain a greater quantity and quality of information than would be available using traditional schema techniques. For example, identification module 110 may glean information relating to abstract and/or latent aspects of the computer stability problem, such as a severity of the computer stability problem and/or a duration (qualities that are often very useful in remediation efforts). In some examples, information 226 may also include information gleaned from non-log-file sources analyzed by machine learning classifier 120 and/or from metadata associated with log lines 222 analyzed by machine learning classifier 120.

In one embodiment, identification module 110 may determine (e.g., based on information 226), that the computer stability problem was likely caused by a malicious event incited by malicious program 228. In some examples, information 226 may include information that implies that a malicious event occurred (e.g., by describing behavior that is often indicative of a malicious attack, such as code injection, shared library creation or modification, registry entry creation of modification, kernel component installation of modification, etc.). In other examples, information 226 may include a direct reference to a program that is known to be malicious.

At step 310, one or more of the systems described herein may, based on the information relating to the computer stability problem, remediate the device to resolve the computer stability problem. For example, remediation module 112 may, as part of computing device 202 and/or server 206 in FIG. 2, based on information 226, remediate computing device 202 to resolve the computer stability problem.

Remediation module 112 may remediate computing device 202 in a variety of ways. In examples in which the computer stability problem was caused by a malicious event incited by malicious program 228, remediation module 112 may remediate computing device 202 by performing a security action. In one embodiment, the security action may include removing malicious program 228 from computing device 202 and/or blacklisting at least one of the malicious event and malicious program 228. In some examples, the security action may include transmitting a notification to computing device 202 and/or to an additional computing device (e.g., security event incident manager).

As described above, the disclosed systems and methods glean information from log lines by working directly on the language contained within the log lines (instead of maintaining parsers that extract information and map events into a database with a single schema). As such, the disclosed systems and methods bypass a layer of indirection. Additionally, by treating each log line as a raw data source from which information may be directly obtained, the disclosed systems and methods may obtain an amount and quality of information that is significantly richer than that obtained through conventional schema-based protocols. Furthermore, because the text itself is being analyzed, the disclosed systems and methods may be able to parse novel log lines and/or log lines created and/or maintained by devices that are unsupported by conventional protocols (e.g., because the device's log lines have not been included in the conventional protocols' schemas). Moreover, because the disclosed systems and methods do not rely on event schemas, the disclosed systems and methods bypasses the need to constantly maintain and update parsers corresponding to an event schema.

Figure 8:
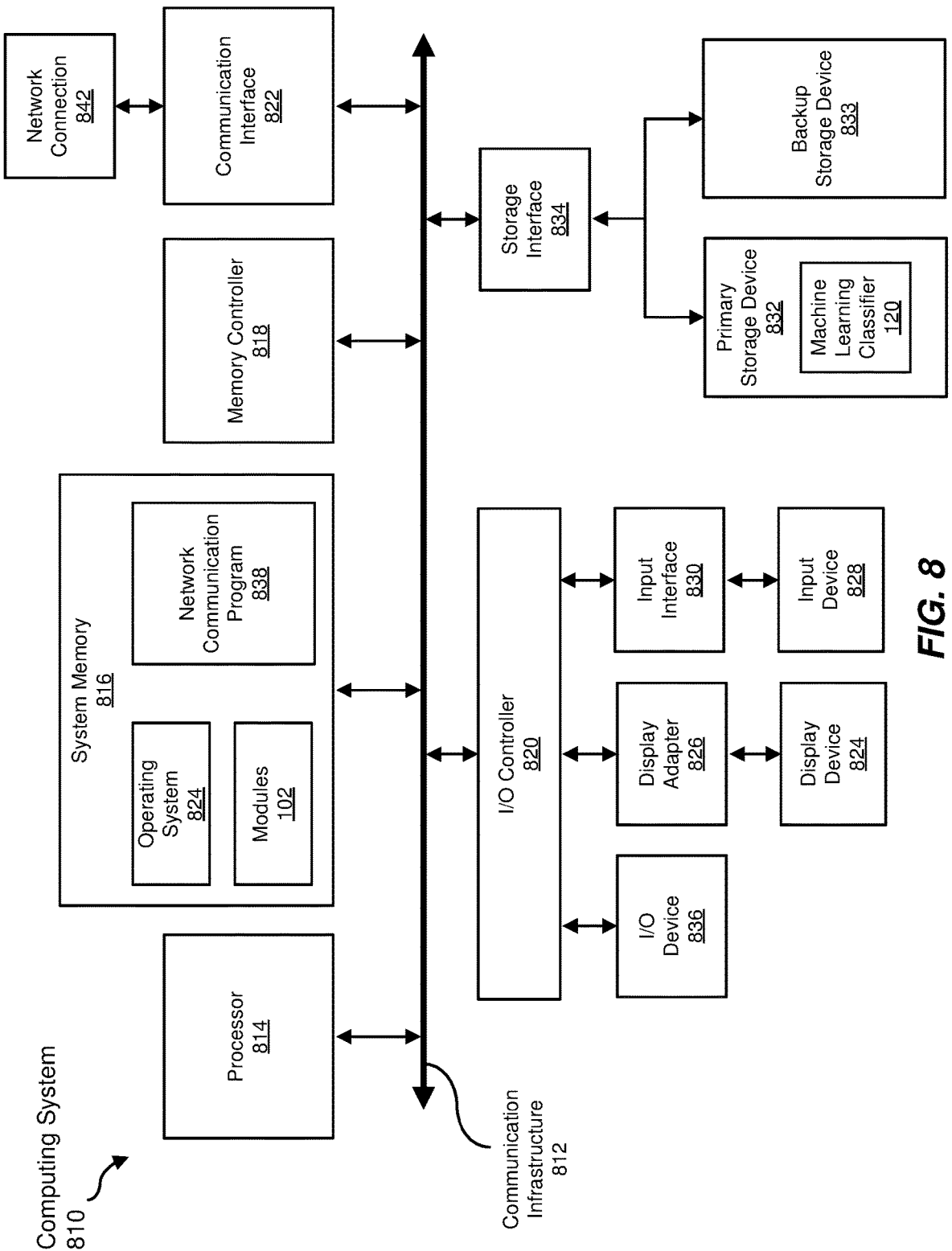
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 824 for execution by processor 814. In one example, operating system 824 may include and/or represent software that manages computer hardware and software resources and/or provides common services to computer programs and/or applications on computing system 810. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, machine learning classifier 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
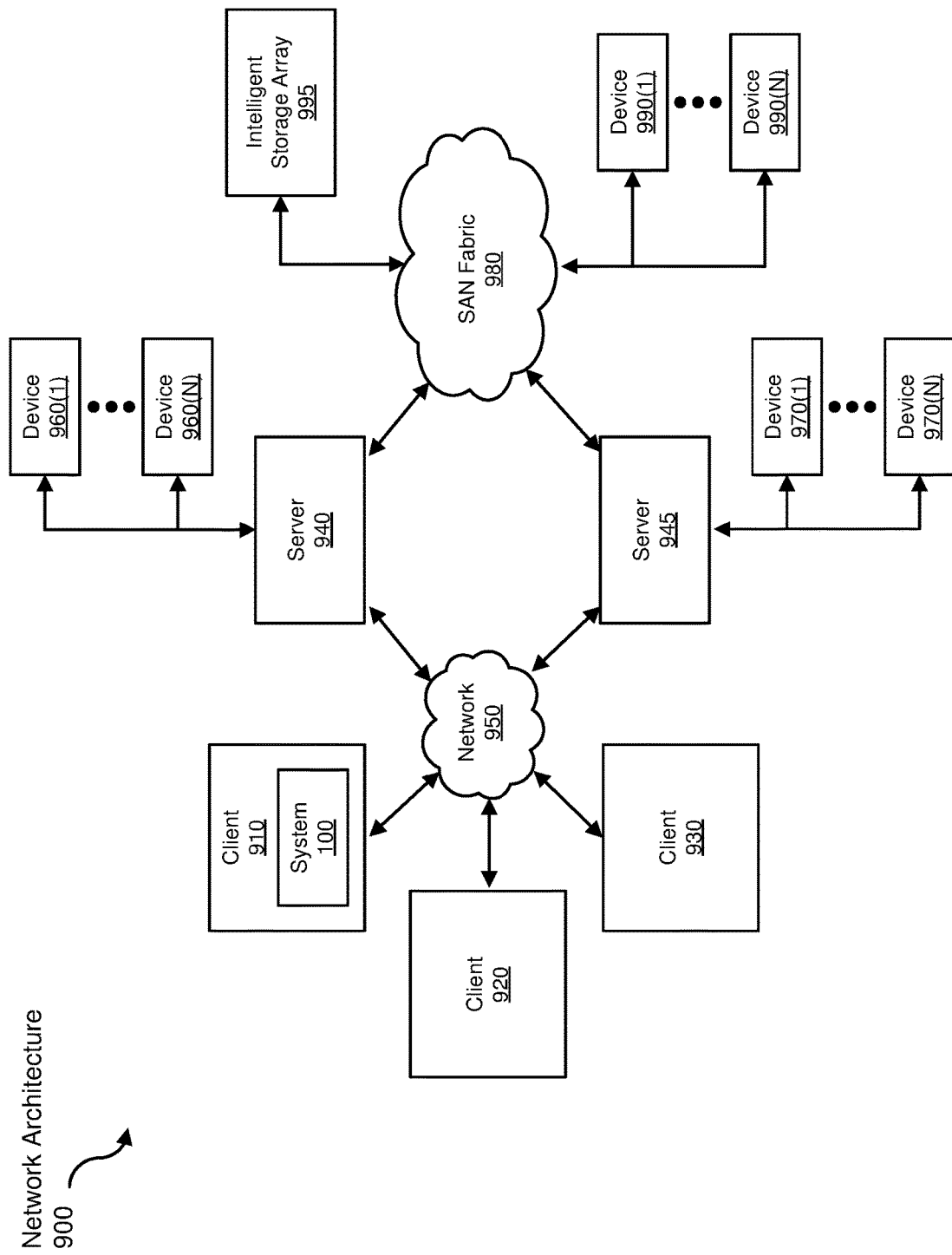
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for remediating computer stability issues.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive log line text and transform the log line text into a computer state determination. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for remediating computer stability issues, at least a portion of the method being performed by a computing device comprising at least one processor, the method comprising:
   training a machine learning classifier that utilizes a generative statistical model to identify stability-disrupting computer events based solely on text within log lines;
   after training the machine learning classifier, determining that a device has experienced a computer stability problem;
   obtaining, from the device, one or more computer-generated log lines that were created during a time period corresponding to a time during which the device experienced the computer stability problem, wherein:
      the computer-generated log lines represent computer-generated records, stored in folders of the device, that track computer events that occur within the device; and
      obtaining the computer-generated log lines comprises scanning the folders for the computer-generated log lines by using parsers to (i) identify which section of a computer-generated log line identifies the origination of an event and (ii) identify which section of the computer-generated log line identifies the event's endpoint;
   using the machine learning classifier to directly analyze unstructured text included within the computer-generated log lines, without mapping the unstructured text into a structured event schema, by mapping information obtained from the computer-generated log lines into a latent space representing activity for the device within a time frame that is relevant to the computer stability problem;
   identifying information relating to the computer stability problem based on the direct analysis of the unstructured text, without relying on any previously established event schemas; and
   based on the information relating to the computer stability problem, remediating the device to resolve the computer stability problem.

2. The computer-implemented method of claim 1, wherein determining that the device has experienced the computer stability problem comprising determining that the device has experienced the computer stability problem in response to identifying at least one of:
   a decrease in the overall stability of the device;
   a decrease in the stability of application software installed on the device; and
   a decrease in the stability of system software installed on the device.

3. The computer-implemented method of claim 1, wherein the generative statistical model comprises latent Dirichlet allocation.

4. The computer-implemented method of claim 1, wherein identifying the information relating to the computer stability problem comprises identifying information relating to a severity of the computer stability problem.

5. The computer-implemented method of claim 1, wherein:
   the device comprises a client device running client-security software provided by a security service;
   the computer-generated log lines comprise log lines created by the client-security software; and
   obtaining the one or more computer-generated log lines comprises obtaining the one or more computer-generated log lines from the client-security software.

6. The computer-implemented method of claim 1, wherein training the machine learning classifier comprises training the machine learning classifier with examples of log files associated with one or more previously identified stability problems.

7. The computer-implemented method of claim 1, wherein:
   at least one of the computer-generated log lines comprises a novel log line that has no corresponding event-schema entry in any previously established structured event schemas;
   the novel log line was produced by at least one of:
      a novel program whose log lines had not previously been analyzed by a stability remediation service; and
      a recently updated program whose log lines had not been analyzed by the stability remediation service.

8. The computer-implemented method of claim 1, wherein identifying the information relating to the computer stability problem comprises identifying information relating to a duration of the computer stability problem.

9. The computer-implemented method of claim 1, wherein scanning the folders for the computer-generated log lines comprises filtering out computer-generated log lines that include text that has been previously identified via machine learning as not pertaining to computer stability issues.

10. The computer-implemented method of claim 1, wherein:
   the method further comprises determining, based on the information relating to the computer stability problem, that the computer stability problem was likely caused by a malicious event incited by a malicious program; and
   remediating the device comprises performing a security action.

11. The computer-implemented method of claim 10, wherein the security action comprises at least one of:
   removing the malicious program from the device;
   transmitting a notification to at least one of the device and an additional computing device that indicates that device has been infected with malware; and
   blacklisting at least one of the malicious event and the malicious program.

12. A system for analyzing computer stability issues, the system comprising:
   an analysis module, stored in memory, that trains a machine learning classifier that utilizes a generative statistical model to identify stability-disrupting computer events based solely on text within log lines;
   a determination module, stored in memory, that determines, after the machine learning classifier has been trained, that a device has experienced a computer stability problem;
   an obtaining module, stored in memory, that obtains, from the device, one or more computer-generated log lines that were created during a time period corresponding to a time during which the device experienced the computer stability problem, wherein:
      the computer-generated log lines represent computer-generated records, stored in folders of the device, that track computer events that occur within the device; and
      obtaining the computer-generated log lines comprises scanning the folders for the computer-generated log lines by using parsers to (i) identify which section of a computer-generated log line identifies the origination of an event and (ii) identify which section of the computer-generated log line identifies the event's endpoint;

wherein the analysis module uses the machine learning classifier to directly analyze unstructured text included within the computer-generated log lines, without mapping the unstructured text into a structured event schema, by mapping information obtained from the computer-generated log lines into a latent space representing activity for the device within a time frame that is relevant to the computer stability problem;

an identification module, stored in memory, that identifies information relating to the computer stability problem based on the direct analysis of the unstructured text, without relying on any previously established event schemas;

a remediation module, stored in memory, that, based on the information relating to the computer stability problem, remediates the device to resolve the computer stability problem; and at least one physical processor configured to execute the determination module, the obtaining module, the analysis module, the identification module, and the remediation module.

13. The system of claim 12, wherein the determination module determines that the device has experienced the computer stability problem by determining that the device has experienced the computer stability problem in response to identifying at least one of:

a decrease in the overall stability of the device;

a decrease in the stability of application software installed on the device; and a decrease in the stability of system software installed on the device.

14. The system of claim 12, wherein the generative statistical model comprises latent Dirichlet allocation.

15. The system of claim 12, wherein the identification module identifies the information relating to the computer stability problem by identifying information relating to at least one of a severity of the computer stability problem and a duration of the computer stability problem.

16. The system of claim 12, wherein:

the device comprises a client device running client-security software provided by a security service;

the computer-generated log lines comprise log lines created by the client-security software; and the obtaining module obtains the one or more computer-generated log lines by obtaining the one or more computer-generated log lines from the client-security software.

17. The system of claim 12, wherein the analysis module trains the machine learning classifier by training the machine learning classifier with examples of log files associated with one or more previously identified stability problems.

18. The system of claim 12, wherein at least one of the computer-generated log lines comprises a novel log line that has no corresponding event-schema entry in any previously established event schemas.

19. A non-transitory computer-readable medium comprising one or more computer-readable instructions that, when executed by at least one processor of a computing device, cause the computing device to:

train a machine learning classifier that utilizes a generative statistical model to identify stability-disrupting computer events based solely on text within log lines;

after training the machine learning classifier, determine that a device has experienced a computer stability problem;

obtain, from the device, one or more computer-generated log lines that were created during a time period corresponding to a time during which the device experienced the computer stability problem, wherein:

the computer-generated log lines represent computer-generated records, stored in folders of the device, that track computer events that occur within the device; and obtaining the computer-generated log lines comprises scanning the folders for the computer-generated log lines by using parsers to (i) identify which section of a computer-generated log line identifies the origination of an event and (ii) identify which section of the computer-generated log line identifies the event's endpoint;

use the machine learning classifier to directly analyze unstructured text included within the computer-generated log lines, without mapping the unstructured text into a structured event schema, by mapping information obtained from the computer-generated log lines into a latent space representing activity for the device within a time frame that is relevant to the computer stability problem;

identify information relating to the computer stability problem based on the direct analysis of the unstructured text, without relying on any previously established event schemas; and remediate the device to resolve the computer stability problem.

20. The non-transitory computer-readable medium of claim 19, wherein the generative statistical model comprises latent Dirichlet allocation.

* * * * *